April 22, 1941.    F. E. WEICK    2,239,475
BALANCING AIRCRAFT CONTROL SURFACES
Filed July 24, 1937    2 Sheets-Sheet 1
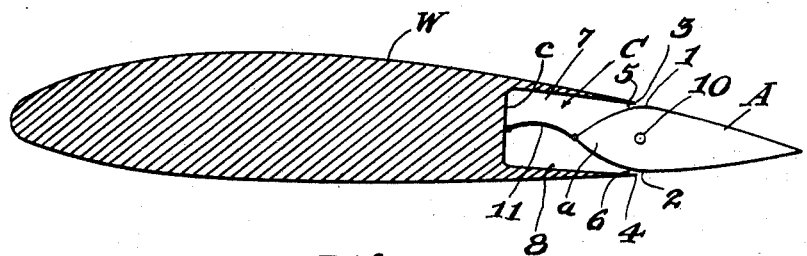
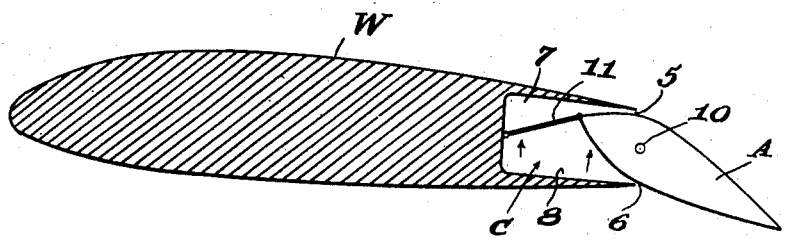
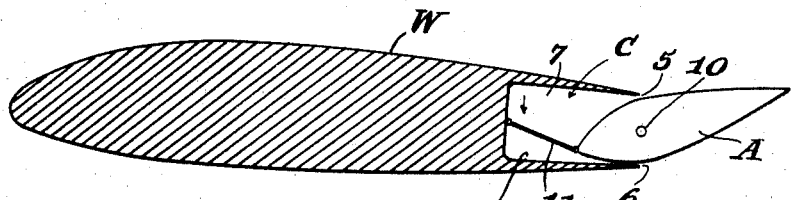
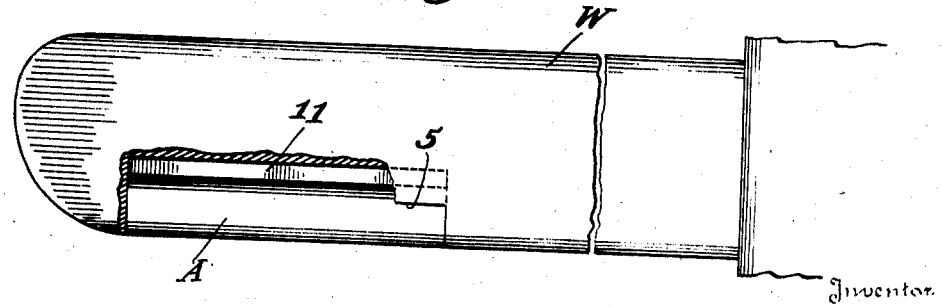
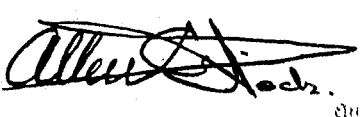
Inventor
Fred E. Weick
Attorney

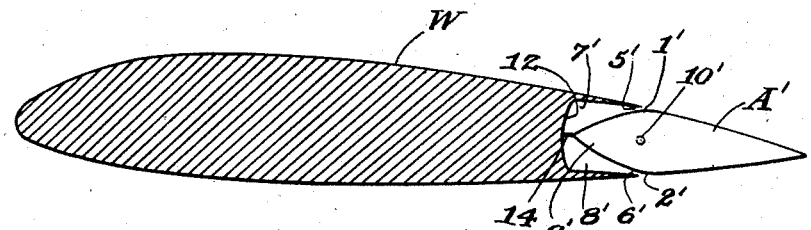
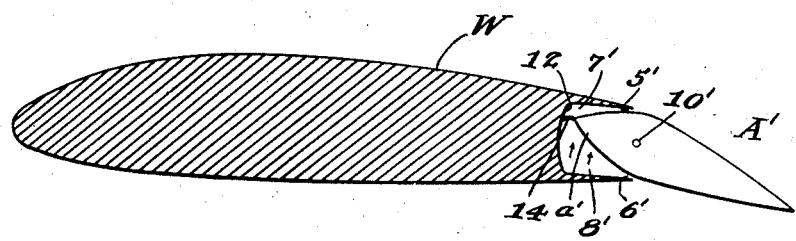
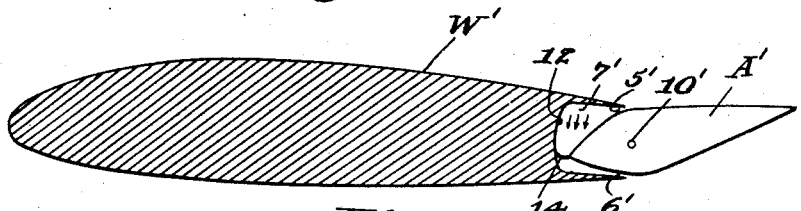
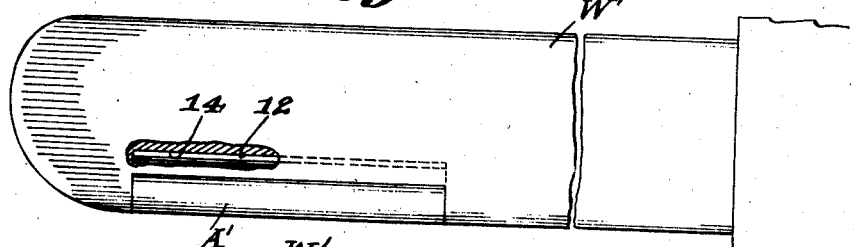

Patented Apr. 22, 1941

2,239,475

UNITED STATES PATENT OFFICE

2,239,475

BALANCING AIRCRAFT CONTROL SURFACES

Fred E. Weick, Bethesda, Md.

Application July 24, 1937, Serial No. 155,523

6 Claims. (Cl. 244—90)

The present invention relates to certain improvements in balancing aircraft control surfaces; and the nature and objects of the invention will be readily recognized and understood by those skilled in the aeronautical art in the light of the following explanations and detailed descriptions of the accompanying drawings illustrating what I now believe to be the preferred embodiments or mechanical and aerodynamic expressions of my invention from among various other forms, embodiments, designs, combinations and constructions of which the invention is capable within the broad spirit and scope thereof.

With aircraft control surfaces, such for example, as lateral or roll control surfaces or ailerons, rudders, elevators and such like, it is found desirable to provide for balancing such surfaces by applying forces thereto in addition to the operating force applied by the control system, acting in a direction to assist movement of a surface in the desired control direction to thereby reduce the operating forces required from the control system. The conventional arrangements for balancing a control surface are generally typified by the provision of structure carried by or coupled with the control surface and spaced from the control surface hinge axis for projection into the airflow when the surface is moved from neutral in a control direction, so that the reaction of the airflow on the projected structure will establish a turning moment acting on the control surface in a direction to aid movement of the surface by the control system in the desired direction.

Such types of aircraft control surface balancing arrangements present certain inefficiencies and undesirable results due essentially to the increase in drag when the balance portion or structure for the control surface is projected into and reacted upon by the airflow, and also due to the interruptions to and breaking up of the airflow by the projected structure; and a primary object and purpose of my present invention is to eliminate or substantially reduce the disadvantages and inefficiencies of the above-referred to character, by providing a method of balancing control surfaces and for damping the control movements thereof, which utilizes the varying pressure conditions at opposite sides of the control surface and associated airfoil for applying balancing forces to the control surface, but without requiring the projection of structure exterior of a control surface and associated airfoil into the airflow past the control surface and/or such airfoil, or requiring a drag producing slot permitting continuous airflow entirely through the wing.

An aircraft control surface or member is generally mounted on or associated with a lift surface or airfoil, and the control surface is usually mounted at the rear and as a trailing portion of and carrying out the airfoil section and contour of the lift surface or airfoil. This arrangement is particularly typified by the generally conventional mounting and arrangement of a lateral control surface or aileron as a vertically displaceable element of the trailing portion of an airplane wing or lift surface and in normal flight with the control surface in neutral control position there exist different air pressure conditions at opposite sides of the associated lift surface or airfoil and control surface which pressure conditions are changed upon and in accordance with the direction and extent of angular control displacement of the control surface relative to the wing or lift surface. It is a fundamental principle and feature of my invention to utilize the foregoing varying air pressure conditions existing at opposite sides of an airfoil or lift surface and associated control surface, to apply turning moments to the control surface acting in a direction to aid the control movement arbitrarily imposed on the control surface by its control operating system.

A feature of my invention further resides in the provision of a design and arrangement of means for so utilizing air pressure conditions as to generate and apply a turning moment to a control surface without the necessity for employing any structure or elements projected into the airflow exteriorly of and beyond the contour surfaces of the lift surface and the control surface mounted thereon and associated therewith.

A further feature resides in providing opposite pressure chambers or spaces within the confines of a lift surface, in which different pressure conditions are established by placing these opposite chambers in continuous communication with the airflow conditions at opposite sides respectively of the lift surface, and in providing an actuating element between said chambers as the medium acted upon in the desired direction by the pressure differences between the opposite wing chambers to apply the required balancing force or moment to the control surface.

Another feature and characteristic of the invention is presented by an arrangement through the medium of which a damping effect is obtained on the control surface operation by permitting restricted passage or bleeding of air pressure between the opposite pressure chambers or spaces, past or through the control surface element as the latter moves through and in the chambers with operation of the control surface.

Another characteristic of the invention is found in the arrangement by which the forward leading edge portion or section of a control surface forward of its hinge axis is confined throughout the range of control surface operation within the confines of the airfoil or wing with which such surface is associated, and the opposite surfaces of which leading edge portion are subjected to the pressure differences established at opposite sides of the airfoil and control surface in such a manner as to create a turning moment acting on the control surface in a direction in accordance with the direction of control surface movement.

With the foregoing general objects, features and results in view, as well as certain others which will be apparent from the following explanations, my invention consists in certain novel features in design, construction and arrangement of elements and parts, and in the steps and procedure followed in the described method, all as will be more fully and particularly referred to and specified hereinafter.

Referring to the accompanying drawings in which similar reference characters refer to corresponding figures throughout:

Fig. 1 is a diagrammatic transverse vertical section through an airplane wing and trailing vertically displaceable lateral control surface or aileron, showing an arrangement of the wing and aileron to provide the wing chamber in communication with the airflow at the upper and lower surfaces of the wing, together with one form of flexible balancing force applying member which is motivated by the pressure differences at opposite sides of the wing chamber; the aileron being shown in its normal, neutral control position.

Fig. 2 is a view similar to Fig. 1 but showing the aileron in its downwardly swung control position.

Fig. 3 is a view similar to Fig. 1 but showing the aileron in its upwardly swung control position.

Fig. 4 is a more or less diagrammatic view in top plan of the wing and aileron balancing arrangement of the form of Figs. 1 to 3; a portion of the wing being broken away forward of the aileron leading edge and above the pressure differential chamber within the wing.

Fig. 5 is a diagrammatic view in vertical transverse section through a wing and aileron showing a modified arrangement of the invention for utilizing the pressure differentials established in the wing chamber, and for applying the balancing forces therefrom in accordance with the method of the invention; the aileron being shown in its normal neutral control position.

Fig. 6 is a view similar to Fig. 5 but showing the aileron in its downwardly swung control position.

Fig. 7 is a view similar to Fig. 5 but showing the aileron in its upwardly swung control position.

Fig. 8 is a more or less diagrammatic view in top plan of the wing and aileron balancing arrangement of Figs. 5 to 7, a portion of the wing upper surface above the aileron leading edge and wing pressure chamber being broken away.

Fig. 9 is a fragmentary detail view showing the aileron leading edge-carried sealing member or wiping blade of the form of the invention of Figs. 5 to 8.

Fig. 10 is a more or less diagrammatic vertical transverse section through the trailing portion of a wing and a portion of an aileron thereon showing a modified arrangement of the form of the invention of Figs. 5 to 9, in which a continuously open passage or slot is maintained between the leading edge of the aileron and the forward wall of the pressure chamber by which the upper and lower portions of the chamber are in continuous restricted communication.

As an example of one possible embodiment and arrangement, mechanically and aerodynamically expressing the principles and broad features of a control surface balancing arrangement of the invention, I have more or less diagrammatically illustrated in Figs. 1 and 4 of the drawings, an airplane wing W with an aileron or lateral control surface A mounted at and forming a trailing portion of the wing W for a distance along its span, all in the more or less general and conventional manner known in the art. The aileron A is, as usual, mounted for vertical swinging or displacement about the hinge axis 10, and in normal neutral control position, as shown in Fig. 1, the aileron forms a trailing portion of the wing W carrying out the normal airfoil section thereof, which wing, in this instance happens to be of substantially symmetrical section.

With such general arrangement, it is well recognized, of course, that in flight with the aileron in neutral control position carrying out the basic wing airfoil section, there is a difference in the air pressures above and along the upper and lower surfaces of the wing, the pressure below the wing being greater than the pressure above the wing These pressure conditions are changed for the span of the wing along the aileron when the aileron is swung upwardly or is swung downwardly in its control positions. When the aileron A is swung upwardly the air pressure at the upper surface of the wing and aileron is increased and the pressure at the lower surface is decreased. In downwardly swung position of the aileron A the positive air pressure below the wing and aileron is further increased while the low pressure condition above the wing and aileron is further decreased.

In accordance with my invention, I utilize these different air pressures established and existing at and between the upper and lower surfaces of the trailing portion of the wing and aileron to apply turning moments to the aileron in directions to balance and assist the control movement of the aileron either upwardly or downwardly.

Within the trailing portion of the wing W, which wing in the example hereof is purely diagrammatically indicated, I provide a space or chamber C along and substantially throughout the span of the aileron A, with the rear end or side of this chamber C open and receiving and substantially closed by the aileron A, as will be clear by reference to Fig. 1. In this example, the aileron A is substantially symmetrical in form and is curved or contoured chordwise thereof at 1 and 2 on its upper and lower surfaces, respectively, along its span and adjacent the trailing edges 3 and 4 of the upper and lower surfaces of the wing W, such curved portions being arcs of a circle having the hinge axis 10 as its center or axis. These curved portions 1 and 2 of the aileron A along the span thereof are spaced a slight distance from the adjacent trailing edges 3 and 4 of the upper and lower surfaces, respectively, of the main portion of the wing W, so as to provide the passages or slots 5 and 6 at the upper and lower surfaces of the aileron between the aileron and the adjacent trailing edges of the upper and lower skin or surfaces of the wing. These passages are continuously open and thus place the upper and lower sections of the chamber or space C in constant communication with the airflow and pressure conditions at the upper and lower surfaces, respectively, of the wing and aileron. The leading edge section or portion $a$ of the aileron A extends a distance into the chamber C but is spaced rearwardly from the forward wall $c$ of this chamber. Due to the chord-wise curvature of the upper and lower surface portions 1 and 2 of the aileron A, the passages or slots 5 and 6 are maintained continuously spaced from the trailing edges 3 and 4 of the upper and lower wing surfaces and are constantly open and of substantially the same width in all positions of aileron A throughout the range of vertical displacement or swinging of the aileron, as will be clear by reference to Figs. 3 and 4 of the drawings.

In the embodiment of the invention of Figs. 1 to 4, a strip of suitable flexible material 11 is connected to and fixed along one edge thereof to the leading edge of the aileron A and extends forwardly across the chamber C throughout the span of the chamber, and is connected along its forward edge to the forward wall $c$ of the chamber C intermediate the top and bottom walls of the chamber and substantially opposite the leading edge of the aileron when the latter is in its normal neutral control position. This strip of material 11 thus forms a wall or partition providing a diaphragm or membrane dividing the chamber C into the upper and lower sections or chambers 7 and 8, with the chamber 7 in communication with the exterior of the wing at the upper surface thereof through the slot 5, and the chamber 8 in connection with the exterior of the wing at the lower or under surface thereof through the slot 6.

The strip of flexible material forming the dividing wall or diaphragm between the upper and lower chambers 7 and 8 and connecting the leading edge of the aileron A with the forward wall $c$ of the chamber C, is of a width to provide slack in the material with the aileron A in its normal neutral control position, as will be clear by reference to Fig. 1. Sufficient slack is provided to permit the aileron A to be swung to and assume its maximum lowered or maximum raised positions, as shown in Figs. 3 and 4, and in the example hereof, when the aileron is in such maximum control positions, the flexible material wall 11 has substantially all of the slack therein taken up and is extended between the raised or lowered leading edge of the aileron A within the chamber C, and the forward wall $c$ of such chamber.

In flight operation of the wing and aileron balancing arrangement of Fig. 1, with the aileron in normal neutral control positions as shown in Fig. 1, there is a greater air pressure at the under surface of the wing than at the upper surface of the wing, so that there is a pressure differential existing between the air pressures in the upper and lower chambers 7 and 8 within the wing, which chambers are in communication with and obtain the same pressure conditions as the upper and lower sides of the wing with which they are respectively in communication through the slots 5 and 6. The flexible diaphragm or partition wall 11, tends to maintain this pressure differential by separating these chambers.

With such conditions prevailing, when the aileron A is swung downwardly to wing camber and lift increasing lateral control position as shown in Fig. 2, the higher pressure prevailing and maintained in the lower chamber 8 acts upon the flexible material member 11 and upon the lower surface of the leading edge section $a$ of the aileron A in a direction to raise the aileron leading edge and apply a turning moment to the aileron A tending to swing it downwardly in the direction to aid downward control swinging of this aileron by the pilot operated control system. Downward movement of the aileron A to lowered positions thereof increases the air pressure condition at the lower surface of the wing and increases the pressure in the lower chamber 8, while the air pressure above the wing, and consequently in the upper chamber 7, is decreased so that the pressure differential existing between chambers 7 and 8 acting upon the balancing member 11 and the under surface of the aileron leading edge portion $a$ in the direction to swing the aileron A downwardly, is increased.

When the aileron A is swung upwardly to raised control positions from its normal neutral control position, referring now to Fig. 3 of the drawings, as aileron A swings upwardly, the pressure above the wing is substantially increased with corresponding increase in pressure in the upper chamber 7, while the air pressure in the lower chamber 8 is also decreased. Thus, a pressure differential is established between the upper and lower chambers 7 and 8 which acts on the flexible wall member or diaphragm 11 and the aileron leading edge section $a$, in a direction to apply a turning moment to the aileron A to swing its leading edge downwardly and thus aid upward control swinging of the aileron A and tend to balance the control system operating forces required to swing the aileron A upwardly.

The movements of the leading edge section $a$ of aileron A and the flexible wall 11 in and through the wing chamber C will have a degree of what may well be termed a form of "dashpot" action having the effect of damping the operating movements of an aileron A and the control system of which it may form an element.

In the usual or conventional lateral or roll control system, opposite wing ailerons are provided which are usually simultaneously operated in opposite directions for lateral control, and the aileron A hereof represents one aileron of such control system and arrangement, as it is not deemed necessary to herein show a complete system of opposite ailerons and the operating control mechanism therefor. It will be readily apparent and understood that with opposite ailerons embodying the balancing arrangement of my invention, such oppositely moving ailerons will have the balancing forces applied thereto by the air pressure conditions in accordance with the control movement of each aileron, so that the opposite ailerons and the control system for actuating the same will receive the benefit in control system balance and reduced system operating forces required, without increased drag or breaking up of the airflow over the upper and lower surfaces attendant balancing arrangements requiring projecting elements in the airflow.

In a modified embodiment utilizing the principles of my invention, as shown in Figs. 5 to 9 of the drawings, a wing W' is provided with the aileron A' of the type and design and of the mounting as hereinbefore described with reference to the aileron A of Fig. 1. This aileron A' is vertically swingable about the hinge axis 10' and is formed at its upper and lower surfaces above and below the hinge axis with the chordwise curved portions 1' and 2' along the span of the aileron, spaced from the trailing edges of the upper and lower surfaces or skin of the wing W' to provide the slots 5' and 6' in communication with the upper and lower pressure chambers 7' and 8' formed within the trailing portion of the wing W' along the span of the aileron A'. In this form of the invention, the aileron A' has its leading edge section or portion a' forward of the aileron hinge axis 10' extended through and substantially forwardly across and between the upper and lower chambers 7' and 8' so that this leading edge section forms the substantial part of the movable division or partition wall between chambers 7' and 8', but with the leading edge of this section spaced rearwardly a distance from the forward wall 12 of the chambers 7' and 8'.

The forward wall 12 for the chambers 7' and 8' provides a continuous and unbroken vertical surface which is curved rearwardly as an arc generated with the aileron hinge axis 10' as a center. The leading edge of the aileron A' is provided with a relatively narrow, forwardly projecting strip of a suitable material 14 forming what is in effect a wiping blade or sealing strip in continuous sliding engagement with the forward vertical curved wall 12. This sealing or wiping strip 14 extends along and is co-extensive with the span of the leading edge of the aileron A' and the span or length of the vertical wall 12, and as the aileron A' is swung upwardly and downwardly, it wipes or scrapes across the curved wall 12 in at least partial sealing engagement therewith to thereby form with the aileron leading edge section A' a separating or dividing wall or structure between the upper and lower air pressure chambers 7' and 8'. Preferably this wiping and sealing strip 14 is of a relatively flexible material having relatively light flexible engagement and contact with the wall 12 in order to maintain friction forces as low as possible while obtaining the desired partial sealing between the chambers 7' and 8'. For example, such strip may be in the form of a suitable rubber, textile or combination rubber and textile material of a character to maintain the necessary partial sealing engagement with the wall 12 without generating high friction forces.

The arrangement and mounting of this strip 14 in the leading edge of the aileron A' may be carried out as indicated in Fig. 9 in which the strip is set into the leading edge of the aileron portion a' and is of at least a slightly flexible character so as to bend or flex with its forward engaging edge trailing as the aileron swings upwardly or downwardly to move the strip 14 across the curved forward wall surface 12. In this manner a continuous engagement between the strip and wall 12 is insured as the chamber of highest pressure is always then acting to force the strip in engagement with the wall. However, such flexibility is not essential to the invention and this strip or member 14 may be of a substantially rigid character without vertical bend or flex of any appreciable amount during operation.

The operation and functioning of the balancing means and arrangement of Figs. 5 to 9 is in general similar to that described in connection with the arrangement of Fig. 1. With the aileron A' in the neutral control position of Fig. 5, the air pressure in lower chamber 8' is greater than in the upper chamber 7' due to the fact that these chambers are in open communication through the slots 2' and 1' with the under and upper surface air conditions. As the aileron A' is swung downwardly to the control position of Fig. 6, the air pressure conditions at the under trailing surface of the wing and the aileron are increased in magnitude while the air pressure conditions prevailing at the upper surface of the wing and aileron are decreased in magnitude. Due to this pressure differential between chambers 7' and 8', the higher pressures prevailing in the lower chamber 8' act along the under surface of the leading edge portion a' of aileron A', and the strip or blade 14, to apply a turning moment to the aileron about the axis 10', tending to lower the aileron, thus exerting balancing forces to aid the control movement of the aileron downwardly.

Upward movement of the aileron as shown in Fig. 7 from neutral control position of Fig. 5 causes an increase in the air pressure prevailing at the trailing upper surface of wing W', and in a decrease in the air pressure prevailing at the trailing under surface of the wing. This establishes a higher pressure condition in the upper chamber 7' than in the lower chamber 8' so that the pressure differential between these chambers acts upon the upper surface of the leading edge portion a' of the aileron A', and the strip or blade 14, so that forces are exerted or applied to the aileron to create a turning moment about the hinge axis 10' acting in a direction tending to swing the aileron upwardly and thus balance and aid the upward control movement of the aileron.

Instead of the use of the strip or blade 14 in sliding engagement with the curved wall 12, I may provide an arrangement such as shown in Fig. 10 in which the leading edge section or portion a' of the aileron A' is extended forwardly to provide the rounded leading edge 15 terminating at and in close proximity to the curved forward wall 12 but spaced slightly therefrom so as to provide a continuous passage or opening 16 between the aileron leading edge 15 and the curved wall 12. This space or passage 16 is of relatively small width and may even amount to nothing more than mere operating clearance between the wall and leading edge.

In the forms of the invention specifically disclosed herein, the air pressure space in which the pressure differentials are localized for establishing the control surface balancing moments, is placed in communication with the opposite sides of the airfoil and control surface by slots provided between the opposite surfaces of the control surface and adjacent structure of the airfoil. However, my invention is not so limited but includes the provision of slots or passages through the wing surfaces at other locations, either in addition to the form and location of the specific slots as shown, or as the sole manner of placing the pressure space or chambers in communication with the air pressures at opposite sides of an airfoil or aircraft surface. Similarly, the invention is not intended to be restricted to the form or shape of passage utilized for placing an air pressure space in communication with the desired air pressure conditions.

While I have shown in the selected embodiments of the accompanying drawings, the applications of the principles and features of the invention to control surfaces of the lateral control or aileron types, it is to be understood that the invention is not so limited or restricted but is intended to and includes adaptation of the balancing arrangements to various other aircraft control surfaces, such, for example, as various forms of rudders or yaw control surfaces, elevators or pitch control surfaces, and in fact any movable aircraft surface mounted in associations and locations where air pressure conditions exist from which a motivating air pressure differential can be established for applying balancing forces to the movable surfaces.

It is also evident that various changes, modifications, additions, eliminations, substitutions and variations might be resorted to without departing from the spirit and scope of my invention and hence, I do not wish to limit my invention in all respects to the exact and specific disclosures hereof.

What I claim is:

1. An airfoil, a control surface forming a trailing portion of said airfoil and mounted for angular movement relative thereto for control, said airfoil providing a space therewithin having a forward wall, the leading edge portion of said control surface extending forwardly into and through said space to substantially divide the same into separate chambers at opposite sides of said leading edge portion, said separate chambers in communication with the exterior of the airfoil at opposite sides thereof, respectively, whereby there is established in each chamber an air pressure condition corresponding to the air pressure condition at the side of the airfoil with which said chamber is in communication, a forwardly projecting member carried by said leading edge portion in sliding contact with the forward wall of said space throughout the range of control movements of said control surface, and the said leading edge portion of the control surface and forwardly projecting member carried thereby within said airfoil space subjected to differences in pressure in the chambers at opposite sides thereof.

2. An airfoil, a control surface forming a trailing portion of said airfoil and being mounted for angular movement relative thereto for control, said airfoil providing a space therewithin having a forward wall, the leading edge portion of said control surface extending forwardly into said airfoil space, a flexible material continuous element attached to the leading edge portion of said control surface and extending forwardly therefrom in an uninterrupted manner through and across said airfoil space to and in contacting relation with the forward wall of said space, the leading edge portion of said control surface and said continuous flexible material element dividing said airfoil space into separate chambers at opposite sides, respectively, of the leading edge portion of said control surface and the said flexible material element, said separate chambers being in communication with the exterior of the airfoil at opposite sides respectively of the airfoil whereby there is established in each chamber an air pressure condition corresponding to the air pressure condition at that side of the airfoil with which said chamber is in communication, and the leading edge portion of the control surface and the flexible material member within said airfoil space being subjected to differences in pressure in the chambers at opposite sides thereof.

3. An airfoil, a control surface forming a trailing portion of said airfoil and being mounted for angular movement relative thereto for control, said airfoil providing a space therewithin having a forward wall, the leading edge portion of said control surface being disposed in the trailing portion of said airfoil space, a member carried by and movable with the leading edge portion of said control surface to positions of angular displacement relative to the forward wall of said airfoil space as said control surface is moved angularly relative to said airfoil, the said member being extended forwardly from the leading edge portion of the control surface to and maintained in sliding contact with the forward wall of said space throughout the range of control movements of said control surface, the leading edge portion of said control surface and said forwardly projecting member dividing said airfoil space into separate chambers at opposite sides, respectively, of the said leading edge portion of the control surface and said forwardly projecting member carried thereby, and said separate chambers being in communication with the exterior of the airfoil at opposite sides, respectively, of the said airfoil, whereby there is established in each chamber an air pressure condition corresponding to the air pressure condition at that side of the airfoil with which such chamber is in communication.

4. An airfoil, a control surface forming a trailing portion of said airfoil and being mounted for angular movement relative thereto for control, said airfoil providing a space within the trailing portion thereof having a forward wall, the leading edge portion of said control surface being disposed in the trailing portion of said airfoil space, a flexible material member fixed to the leading edge portion of said control surface and being extended forwardly therefrom into sliding and substantially sealing contact with the forward wall of said airfoil space throughout the range of control movements of said control surface, the leading edge portion of said control surface and said forwardly projecting flexible member together dividing said airfoil space into separate chambers within the airfoil at opposite sides, respectively, of the said flexible member and the leading edge portion of said control surface, and the said separate chambers being in communication with the exterior of the airfoil at opposite sides thereof, respectively, whereby there is established in each chamber an air pressure condition corresponding to the air pressure condition at that side of the airfoil with which such chamber is in communication.

5. An airfoil, a control surface forming a trailing portion of said airfoil and being angularly movable relative thereto for control, said airfoil providing a space therewithin having a forward wall and the leading edge portion of said control surface being extended forwardly a distance into but spaced from the forward wall of said airfoil space, a flexible material strip connected between the leading edge portion of said control surface and the forward wall of said airfoil space to thereby divide said space into separate chambers at opposite sides, respectively, of the leading edge portion of said control surface and the flexible strip, said strip of flexible material with the control surface in normal neutral control position having slack therein, said opposite chambers in communication with the exterior of the airfoil at opposite sides thereof, respectively, whereby there is established in each chamber an air pressure condition corresponding to the air pressure condition at that side of the airfoil with which such chamber is in communication, and the said leading edge portion of the control surface and said flexible strip within the airfoil space being subjected to differences in pressure in the chambers at opposite sides thereof respectively.

6. An airfoil, a control surface, forming a trailing portion of said airfoil and being angularly movable relative thereto for control, said airfoil providing a space therewithin having a forward wall and the leading edge portion of said control surface being disposed in the trailing portion of said airfoil space, a flexible material strip connected to and along said leading edge portion and being extended forwardly therefrom through said airfoil space and fixed to said forward wall to thereby divide said airfoil space into separate chambers at opposite sides, respectively, of the leading edge portion of said control surface and said flexible strip, said strip of flexible material being of a width greater than the distance between the leading edge of said control surface and the forward wall of said airfoil space whereby said strip of flexible material has slack therein when the control surface is in normal neutral control position, and said opposite chambers in communication with the exterior of the airfoil at opposite sides, respectively, of the airfoil whereby there is established in each chamber an air pressure condition corresponding to the air pressure condition at that side of the airfoil with which such chamber is in communication.

FRED E. WEICK.